United States Patent
Huang

(10) Patent No.: US 7,182,493 B2
(45) Date of Patent: Feb. 27, 2007

(54) AUTOMATIC DUAL-CONTROL LIGHT EMITTING ASSEMBLY FOR VEHICLE WHEELS

(76) Inventor: Teng-Wen Huang, No. 4, Lane 30, Wu Chuan St., Panchiao City, Taipei Hsien (TW)

( * ) Notice: Subject to any disclaimer, the term of this patent is extended or adjusted under 35 U.S.C. 154(b) by 50 days.

(21) Appl. No.: 11/174,057

(22) Filed: Jun. 30, 2005

(65) Prior Publication Data

US 2007/0002574 A1    Jan. 4, 2007

(51) Int. Cl.
*B60Q 1/00* (2006.01)

(52) U.S. Cl. ............... 362/500; 362/802; 362/464; 362/276; 200/61.45 R

(58) Field of Classification Search ............... 362/500, 362/464, 276, 802, 374, 473; 200/61.52, 200/61.51, 61.45 R, 61.46
See application file for complete search history.

(56) References Cited

U.S. PATENT DOCUMENTS

| | | | |
|---|---|---|---|
| 5,876,108 A * | 3/1999 | Chien | 362/35 |
| 6,070,997 A * | 6/2000 | Duke et al. | 362/500 |
| 6,572,251 B1 | 6/2003 | Huang | |
| 6,742,913 B2 * | 6/2004 | Deutsch | 362/253 |
| 2004/0037085 A1 * | 2/2004 | Panzarella | 362/500 |
| 2005/0047161 A1 * | 3/2005 | Tai | 362/500 |
| 2006/0062008 A1 * | 3/2006 | Hwan | 362/500 |

* cited by examiner

*Primary Examiner*—Thomas M. Sember
(74) *Attorney, Agent, or Firm*—Pro-Techtor Int'l Services

(57) ABSTRACT

An automatic dual-control light emitting assembly for vehicle wheels includes a casing defining a receiving space for receiving at least one battery cell therein; a circuit board having a light-emitting device provided thereon with one electrode electrically connected to a first pole of the battery cell under control of a light sensor, which acts only in a dark environment; a lead frame electrically connecting the circuit board to a second pole of the battery cell; and an elastic metal contact member having an end electrically connected to the circuit board and another end contacting with the lead frame only by a centrifugal force to thereby electrically connect the other electrode of the light-emitting device to a second pole of the battery cell. With the light sensor and the elastic metal contact member, the light-emitting device emits light only when the vehicle wheel rotates in a dim or dark ambient environment.

17 Claims, 5 Drawing Sheets

AUTOMATIC DUAL-CONTROL LIGHT EMITTING ASSEMBLY FOR VEHICLE WHEELS

FIELD OF THE INVENTION

The present invention relates to a light emitting assembly, and more particularly to an automatic dual-control light emitting assembly for vehicle wheels that automatically emits light only when the vehicle wheel rotates in a dim or dark ambient environment, so as to avoid unnecessary waste of battery power in the daytime or in a bright environment.

BACKGROUND OF THE INVENTION

Most vehicles are provided with headlights and taillights, which are turned on when the vehicles move in the nighttime or in a dim or dark environment so as to serve as lighting and warning devices to ensure the safety in driving.

To further ensure the safety in driving, there are car manufacturers and users who mount light-emitting devices on two lateral sides of the vehicles, such as on vehicle wheels, to emit light thereat. The light-emitting devices provided on the vehicle wheels also provide an ornamental effect.

The conventional light-emitting device for vehicle wheel is manually controlled. That is, a driver has to turn on a switch of the light-emitting device for the latter to emit light; and to turn off the switch when it is not necessary to use the light-emitting device. It is troublesome to turn on or off the light-emitting device. Moreover, it is possible the driver does not timely turn on or off the light-emitting device due to negligence, thereby either adversely affecting the safety in driving or unnecessarily waste battery power supplied to the light-emitting device.

U.S. Pat. No. 6,572,251, entitled "Light Emitting Assembly for Vehicle Wheel" granted to the same inventor of the present invention, discloses a light emitting assembly that is mounted on a vehicle wheel to automatically emit light when the vehicle wheel rotates, and to automatically turnoff light emitting when the vehicle wheel stops rotating. The light emitting assembly for vehicle wheel disclosed in U.S. Pat. No. 6,572,251 includes a casing, a circuit board, a lead frame, and an elastic metal contact member.

The casing is provided at an end with a receiving open chamber, in which a battery cell is mounted. The circuit board is disposed on the receiving open chamber of the casing, and provided on one side thereof with a light-emitting device, and at radially inner and outer areas on the other side thereof facing toward the receiving open chamber with first and second annular metal contacts, respectively. The light-emitting device has two electrodes separately electrically connected to the first and second annular metal contacts, and the second annular metal contact is electrically connected to one of two poles of the battery cell via the casing. The lead frame is mounted in the receiving open chamber and located between the first and the second annular metal contact with an end electrically connected to the other pole of the battery cell. The elastic metal contact member has an end fixed to the circuit board and electrically connected to the first annular metal contact. When the vehicle wheel rotates, the elastic metal contact member is biased by a centrifugal force to contact with the lead frame and thereby closes the circuit between the battery cell and the light-emitting device, allowing the latter to emit light. And, when the vehicle wheel stop rotating, the elastic metal contact member restores to its home position without contacting with the lead frame and thereby opens the circuit between the battery cell and the light-emitting device, preventing the latter from emitting light. That is, the light-emitting device automatically emits light or turns off light emitting when the vehicle wheel rotates or stops, respectively. Therefore, the light emitting assembly for vehicle wheel disclosed in U.S. Pat. No. 6,572,251 is convenient for use and effectively increases the safety in driving.

However, when the vehicle moves in the daytime or in a bright environment, it is not necessary to turn on the light-emitting device to serve as lighting and warning means. Moreover, the light emitted from the light-emitting device does not provide significant lighting and warning effects in a bright driving environment. And, the battery cell in the light emitting assembly would have a shortened life when the light-emitting device emits light continuously to consume the battery power all the time.

SUMMARY OF THE INVENTION

A primary object of the present invention is to provide an automatic dual-control light emitting assembly for vehicle wheel, in which a light-emitting device automatically emits light only when the vehicle wheel rotates in a dim or dark environment, and automatically turns off light emitting when the vehicle wheel stops rotating or when the vehicle wheel rotates in the daytime or in a bright environment.

To achieve the above and other objects, the automatic dual-control light emitting assembly for vehicle wheel of the present invention includes a casing, a circuit board, a lead frame, and an elastic metal contact member. The casing defines a receiving space for receiving at least one battery cell therein. The lead frame is mounted in the receiving space of the casing and is electrically connected to one of two poles of the battery cell. The circuit board includes a light-emitting device having two electrodes separately electrically connected to the two poles of the battery cell. The elastic metal contact member has an end electrically connected to the circuit board and another end adapted to contact with the lead frame due to a centrifugal force to thereby electrically connect one of the two electrodes of the light-emitting device to one pole of the battery cell. The present invention is characterized in that the circuit board further includes a light sensor, which and the light-emitting device together constitute a sensing circuit adapted to close or open a circuit between the light-emitting device and the battery cell depending on the brightness of an environment in which the vehicle wheel rotates. Therefore, the light-emitting device automatically turns off light emitting without consuming battery power when the vehicle wheel is stationary or rotates in the daytime or in a bright environment, and automatically emits light only when the vehicle wheel rotates in a dim or dark environment to ensure the safety in driving.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
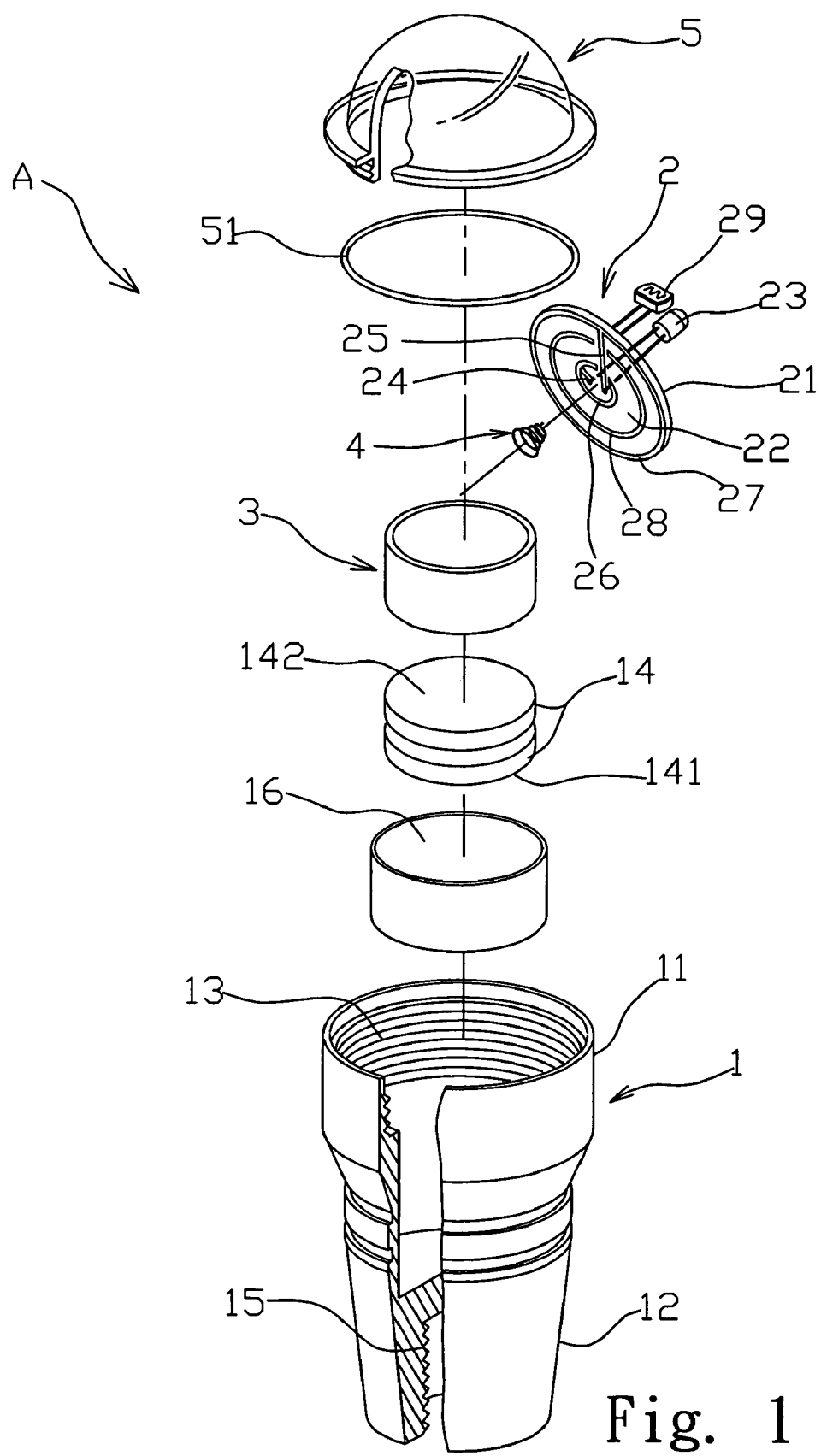
FIG. 1 is an exploded perspective view of an automatic dual-control light emitting assembly for vehicle wheels according to a first embodiment of the present invention.
Figure 2:
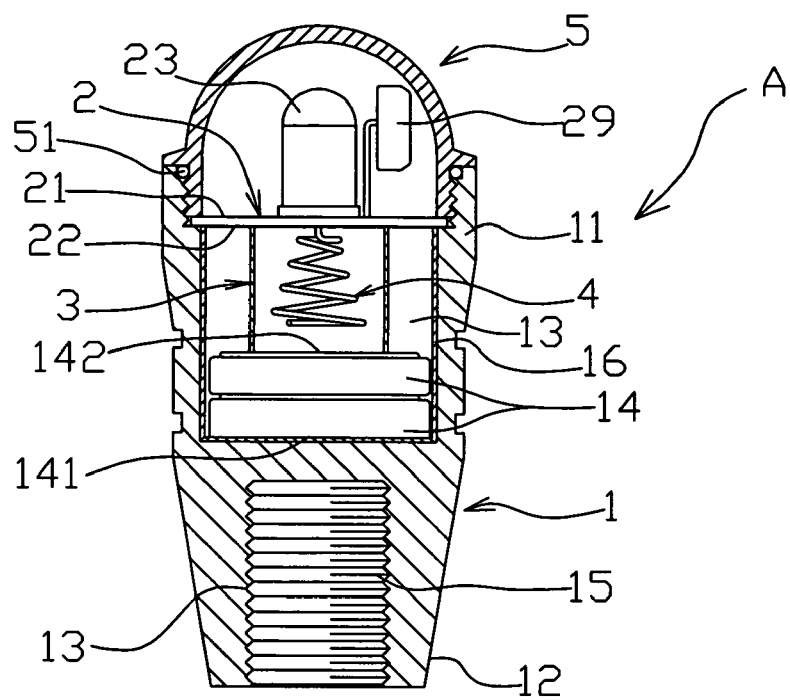
FIG. 2 is an assembled sectional view of the automatic dual-control light emitting assembly for vehicle wheels of FIG. 1 in a stationary state.

FIGS. 1 and 2 are exploded perspective view and assembled sectional view, respectively, of an automatic dual-control light emitting assembly for vehicle wheels according to a first embodiment of the present invention. For the purpose of conciseness, the present invention is generally referred to as "the light emitting assembly A" throughout the description of the specification. As shown, the light emitting assembly A mainly includes a casing 1, a circuit board 2, a lead frame 3, and an elastic metal contact member 4.

The casing 1 has a first end section 11 and a second end section 12. The first end section 11 internally defines a receiving space 13 for receiving at least one battery cell 14 therein. In the illustrated embodiment, there are two battery cells 14 mounted in the receiving space 13. The second end section 12 of the casing 1 is in the form of a valve cap having screw threads 15 on an inner wall thereof for screwing onto an externally threaded tire valve (not shown) on a vehicle wheel.

In the embodiment illustrated in FIG. 1, the casing 1 is made of an insulating material. To achieve the purpose of electrical conduction, a conducting metal contact cup 16 is seated in the receiving space 13 of the casing 1 to electrically contact with a first pole 141 of the battery cells 14.

The circuit board 2 is mounted in the first end section 11 of the casing 1 and has two end surfaces, namely, a first and a second end surfaces 21, 22. The first end surface 21 has a light-emitting device 23, such as a light-emitting diode, provided thereon. The second end surface 22 is oriented toward the receiving space 13 of the casing 1, and is provided along a radially inner and outer areas with a first and a second annular metal contacts 26, 27, respectively. The light-emitting device 23 has two electrodes, which are separately connected to the first and the second annular metal contacts 26, 27 via a first and a second lead wire 24, 25, respectively. The second annular metal contact 27 is also in contact with the metal contact cup 16 in the casing 1, and thereby electrically connected to the first pole 141 of the battery cells 14. The first and the second lead wire 24, 25 are coated with a layer of insulating film.

On the second end surface 22 of the circuit board 2, a third annular metal contact 28 is further provided between the first and the second annular metal contacts 26, 27.

The lead frame 3 is mounted in the receiving space 13 of the casing 1 and located between the first and the second annular metal contact 26, 27. The lead frame 3 has an end electrically connected to a second pole 142 of the battery cells 14, and an opposite end fixedly welded to the circuit board 2 via the third annular metal contact 28. In implementing the present invention, the lead frame 3 may be a conducting collar or a conducting spring adapted to conduct power from the second pole 142 of the battery cells 14 to the circuit board 2.

A light sensor 29 is provided on the circuit board 2 between the two poles of the battery cells 14 to, together with the light-emitting device 23, constitute a sensing circuit. The light sensor 29, which may be, for example, a light resistor, has a variable resistance value that varies with changes in light irradiated thereto, and can therefore control the on and off of the circuit between the battery cells 14 and the light-emitting device 23 according to the brightness of an environment in which the vehicle wheel mounted with the light emitting assembly A rotates.

That is, when the light emitting assembly A is in a bright environment, the light sensor 29 would open the circuit between the light-emitting device 23 and the battery cells 14, so that the light-emitting device 23 is off and does not emit light; and when the light emitting assembly A is in a dim or dark environment, the light sensor 29 would close the circuit between the light-emitting device 23 and the battery cells 14, so that the light-emitting device 23 is on to emit light.

The elastic metal contact member 4 may be a spring or a metal strip having an end fixed to the second end surface 22 of the circuit board 2 and electrically connected to the first annular metal contact 26. When the vehicle wheel mounted with the light emitting assembly A rotates, the elastic metal contact member 4 is biased due to a centrifugal force to contact with the lead frame 3. The elastic metal contact member 4 may be further connected at a free end opposite to the fixed end with a metal weight (not shown), so that the elastic metal contact member 4 has an increased sensitivity to the centrifugal force.

Moreover, a transparent shield 5 is provided on a top of the first end section 11 of the casing 1 to cover the circuit board 2 and the light-emitting device 23 and the light sensor 29 mounted on the circuit board 2 while allowing light to pass through the transparent shield 5. In implementing the present invention, the transparent shield 5 may be, for example, screwed to the first end section 11 of the casing 1. And, an O-ring 51 is disposed between the transparent shield 5 and the casing 1 to ensure an effective sealing joint therebetween.

As can be seen from the above-structured automatic dual-control light emitting assembly of the present invention, one of the two electrodes of the light-emitting device 23 is electrically connected to the first pole 141 of the battery cells 14 via the light sensor 29, which acts according to the brightness in the ambient environment to control the on or off of the light-emitting device 23, the second annular metal contact 27, and the metal contact cup 16. The other electrode of the light-emitting device 23 is electrically connected to the second pole 142 of the battery cells 14 via the first annular metal contact 26, the elastic metal contact member 4 which is centrifugally biased when the vehicle wheel rotates, and the lead frame 3. That is, the light sensor 29 and the elastic metal contact member 4 are two control elements in a dual control of closing and opening the circuit between the light-emitting device 23 and the battery cells 14.

Figure 4:
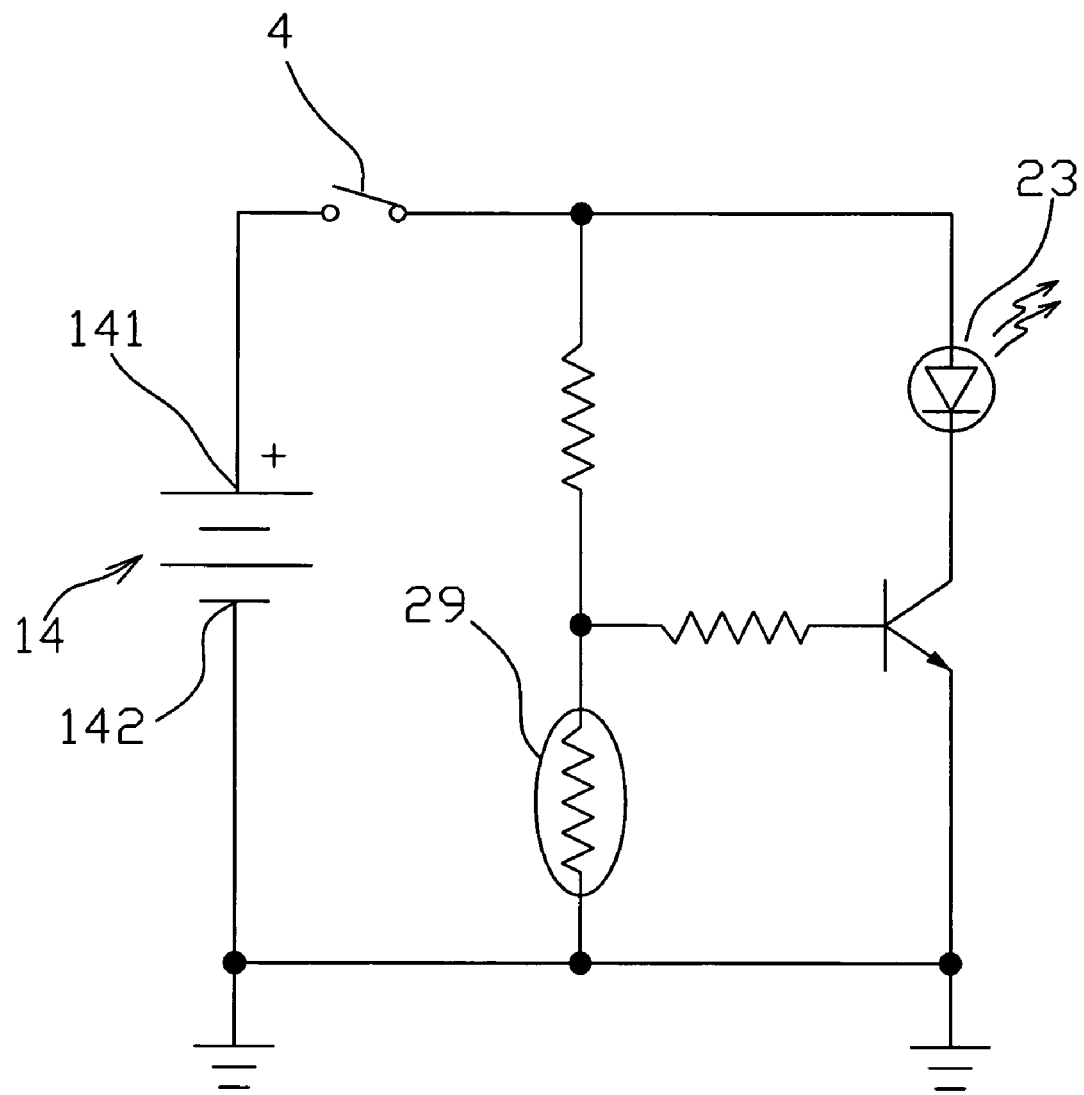
FIG. 4 is a circuit diagram of the automatic dual-control light emitting assembly for vehicle wheels of FIG. 1.

FIG. 4 is a circuit diagram of the present invention. The light sensor 29 of the automatic dual-control light emitting assembly A of the present invention mounted on a vehicle wheel opens the circuit between the light-emitting device 23 and the battery cells 14 when it detects sufficient light, such as in the daytime or in a bright environment, and power supplied from the battery cells 14 to the light-emitting device 23 is automatically cut off. This arrangement effectively saves the battery power consumption so as to prolong the life of the battery cells. More specifically, the light-emitting device 23 is always off and does not emit light as long as there is a sufficient light, such as in the daytime or in a bright environment, no matter whether the vehicle wheel mounted with the automatic dual-control light emitting assembly of the present invention is rotating or not. Since there is a sufficient light in the ambient environment, the safety in driving is not adversely affected even if the light-emitting device 23 does not emit light.

Now referring to FIGS. 2 and 4, when the light sensor 29 of the automatic dual-control light emitting assembly A of the present invention detects that there is no sufficient light, such as in the nighttime or in a dim or dark environment, it automatically closes the circuit between the light-emitting device 23 and the first pole 141 of the battery cells 14. However, in the event the vehicle wheel mounted with the light emitting assembly A is not rotating (i.e. in a stationary state), the elastic metal contact member 4 is in a home position without being centrifugally biased to contact with the lead frame 3. That is, there is an open circuit between the light-emitting device 23 and the second pole 142 of the battery cells 14, and the light-emitting device 23 does not emit light. In brief, the light-emitting device 23 is always off and does not emit light as long as the vehicle wheel is in a stationary state.

Figure 3:
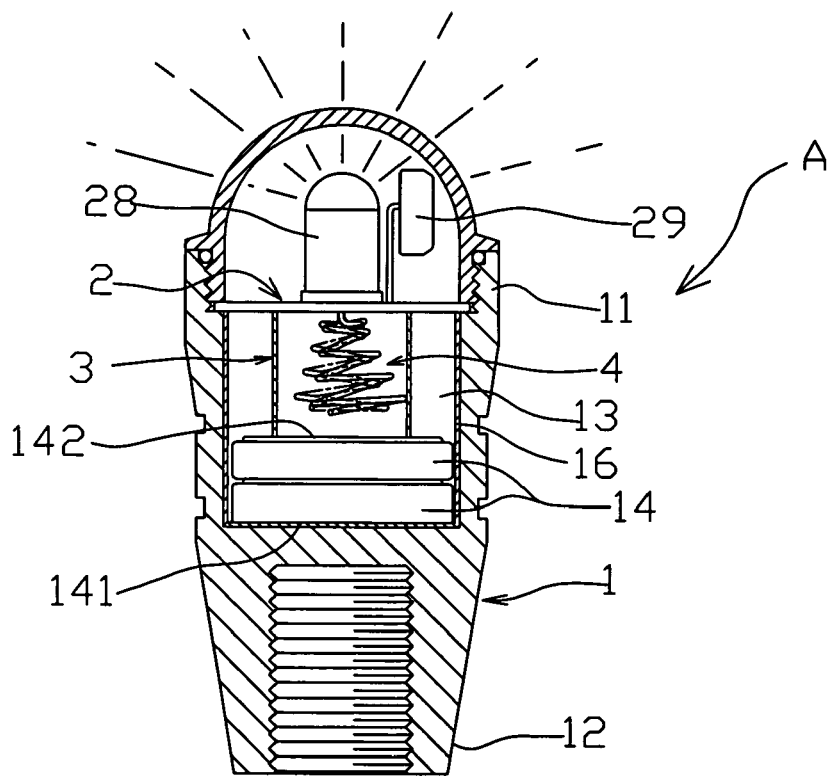
FIG. 3 is an assembled sectional view of the automatic dual-control light emitting assembly for vehicle wheels of FIG. 1 in an actuated state.

Referring to FIGS. 3 and 4, when the light sensor 29 of the automatic dual-control light emitting assembly A of the present invention detects that there is no sufficient light, such as in the nighttime or in a dim or dark environment, it automatically closes the circuit between the light-emitting device 23 and the first pole 141 of the battery cells 14. And, when the vehicle wheel mounted with the light emitting assembly A is rotating, the elastic metal contact member 4 is centrifugally biased to contact with the lead frame 3 to thereby electrically contact with the second pole 142 of the battery cells 14 to automatically close the circuit between the light-emitting device 23 and the second pole 142 of the battery cells 14. At this point, the circuit between the light-emitting device 23 and the battery cells 14 is closed for the light-emitting device 23 to emit light, ensuring the safety of driving in the nighttime or in a dark environment.

Once the vehicle wheel stops rotating, the elastic metal contact member 4 restores to its home position without contacting with the lead frame 3, as shown in FIG. 2. The circuit between the light-emitting device 23 and the battery cells 14 is open again, and the light-emitting device 23 does not emit light.

In conclusion, the automatic dual-control light emitting assembly for vehicle wheels according to the present invention uses the light sensor 29 and the elastic metal contact member 4 to achieve a dual control of the on and off of the circuit between the light-emitting device 23 and the battery cells 14.

The light-emitting device 23 emits light only when the vehicle wheel rotates in a dim or dark environment to ensure the safety in driving without wasting the battery power.

Figure 5:
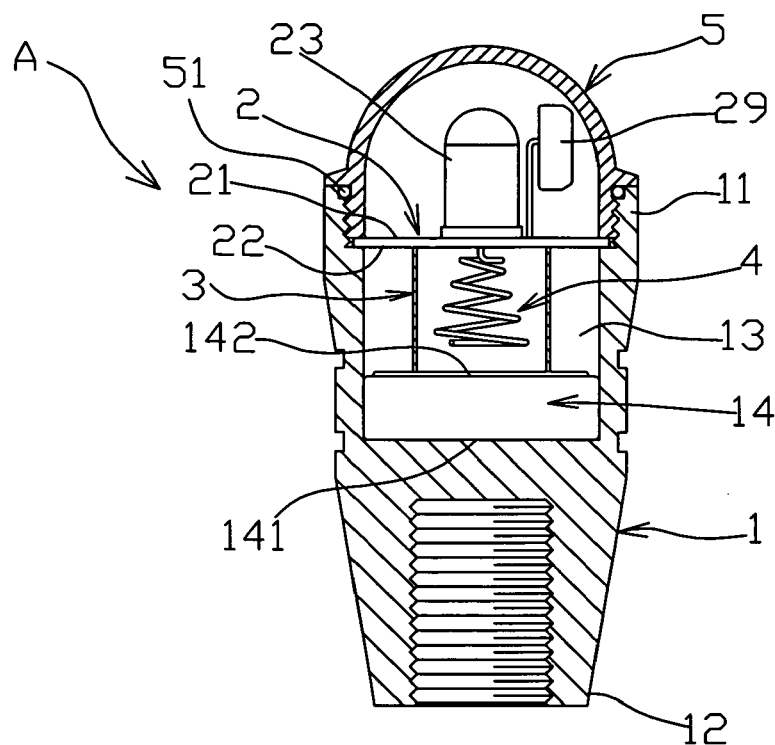
FIG. 5 is an assembled sectional view of an automatic dual-control light emitting assembly for vehicle wheels according to a second embodiment of the present invention.

FIG. 5 is a sectional view of an automatic dual-control light emitting assembly for vehicle wheels according to a second embodiment of the present invention. The second embodiment is generally structurally similar to the first embodiment, except that the casing 1 is made of a conducting material so as to enable omission of the metal contact cup 16 from the receiving space 13. In this case, the second annular metal contact 27 is electrically connected to the first pole 141 of the battery cells 14 via the casing 1.

Figure 6:
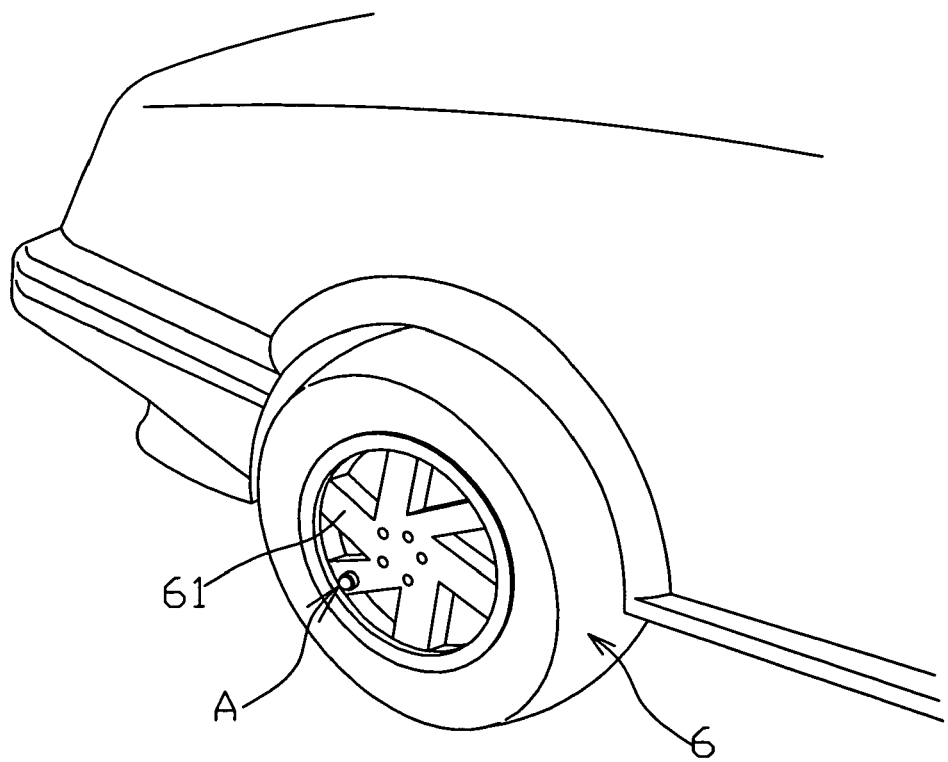
FIG. 6 is a schematic view of the automatic dual-control light emitting assembly for vehicle wheels of the present invention mounted on a car.
Figure 7:
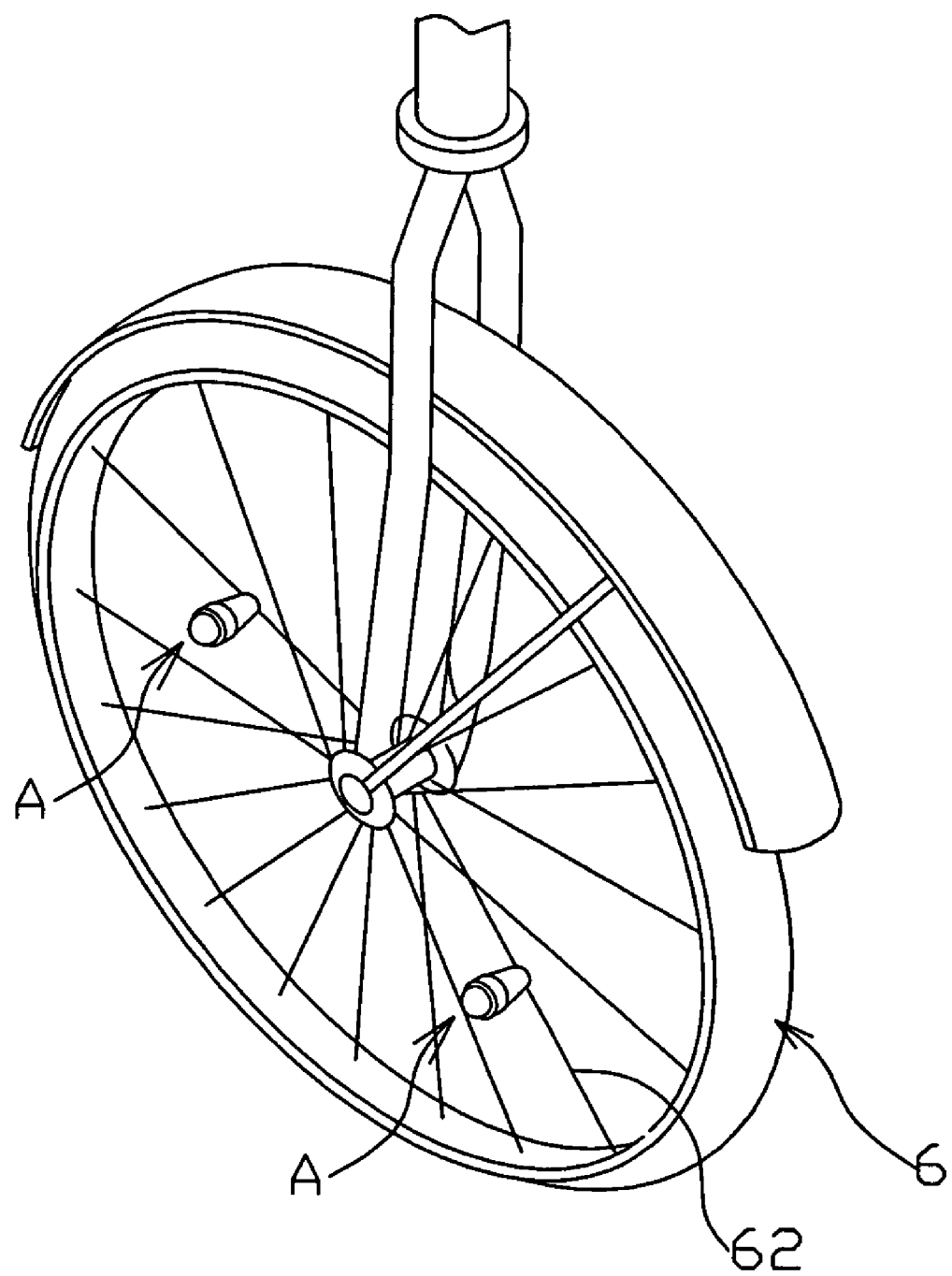
FIG. 7 is a schematic view of the automatic dual-control light emitting assembly for vehicle wheels of the present invention mounted on a bicycle/motorbike.

FIG. 6 shows a schematic view of the implementation of the present invention, which is generally structurally similar to the first embodiment, except that it has a casing designed for inserting into a hole provided on a hubcap 61 of a wheel 6. FIG. 7 shows a schematic view of a still further implementation of the present invention, which is generally structurally similar to the first embodiment, except that it has a casing designed for locking to a spoke 62 of a bicycle wheel 6.

The present invention has been described with some preferred embodiments thereof and it is understood that many changes and modifications in the described embodiments can be carried out without departing from the scope and the spirit of the invention that is intended to be limited only by the appended claims.

What is claimed is:

1. An automatic dual-control light emitting assembly for vehicle wheels, comprising:

a casing having a first and a second end sections, said first end section internally defining a receiving space for receiving at least one battery cell therein;

a circuit board being mounted in said first end section of said casing and having two end surfaces, namely, a first and a second end surfaces; said first end surface having a light-emitting device provided thereon, said second end surface being oriented toward said receiving space of said casing, and being provided along a radially inner and a radially outer areas with a first and a second annular metal contacts, respectively; said light-emitting device having two electrodes, which are separately connected to said first and said second annular metal contacts, and said second annular metal contact being electrically connected to a first pole of said at least one battery cell via said casing;

a lead frame being mounted in said receiving space of said casing to be located between said first and said second annular metal contacts; said lead frame having an end electrically connected to a second pole of said at least one battery cell; and a conducting elastic metal contact member having an end fixed to said second end surface of said circuit board and electrically connected to said first annular metal contact; and said elastic metal contact member being centrifugally biased to contact with said lead frame when said vehicle wheel mounted with said light emitting assembly rotates;

said light emitting assembly for vehicle wheel being characterized in a light sensor mounted on said circuit board between said two poles of said at least one battery cell to, together with said light-emitting device, constitute a sensing circuit for controlling on and off of a circuit between the first pole of said at least one battery cell and said light-emitting device according to a brightness of an environment in which said vehicle wheel rotates.

2. The automatic dual-control light emitting assembly for vehicle wheels as claimed in claim 1, wherein said light sensor is a light resistor.

3. The automatic dual-control light emitting assembly for vehicle wheels as claimed in claim 1, wherein said second end section of said casing is in the form of a valve cap adapted to be screwed onto a tire valve provided on said vehicle wheels.

4. The automatic dual-control light emitting assembly for vehicle wheels as claimed in claim 3, wherein said second end section of said casing is internally provided with screw threads for meshing with external threads provided on said tire valve.

5. The automatic dual-control light emitting assembly for vehicle wheels as claimed in claim 1, wherein said second end section of said casing is configured for being inserted into a hole correspondingly provided on a hubcap of said vehicle wheels.

6. The automatic dual-control light emitting assembly for vehicle wheels as claimed in claim 1, wherein said second end section of said casing is configured for being locked to a spoke of a bicycle wheel.

7. The automatic dual-control light emitting assembly for vehicle wheels as claimed in claim 1, wherein said casing is made of an insulating material, and has a metal contact cup mounted in said receiving space in said first end section of said casing; said metal contact cup being electrically connected to said second annular metal contact on said circuit board and said first pole of said at least one battery cell, such that said second annular metal contact is electrically connected to said at least one battery cell via said metal contact cup.

8. The automatic dual-control light emitting assembly for vehicle wheels as claimed in claim 1, wherein said casing is made of a conducting material, and said second annular metal contact is electrically connected to said at least one battery cell via said casing.

9. The automatic dual-control light emitting assembly for vehicle wheels as claimed in claim 1, wherein said light-emitting device is a light-emitting diode.

10. The automatic dual-control light emitting assembly for vehicle wheels as claimed in claim 1, wherein said lead frame is an electrically conductive collar.

11. The automatic dual-control light emitting assembly for vehicle wheels as claimed in claim 1, wherein said lead frame is an electrically conductive spring.

12. The automatic dual-control light emitting assembly for vehicle wheels as claimed in claim 1, wherein said elastic metal contact member is a spring.

13. The automatic dual-control light emitting assembly for vehicle wheels as claimed in claim 1, wherein said elastic metal contact member is a metal strip.

14. The automatic dual-control light emitting assembly for vehicle wheels as claimed in claim 13, wherein said elastic metal contact member is connected at a free end to a conducting weight.

15. The automatic dual-control light emitting assembly for vehicle wheels as claimed in claim 1, further comprising a transparent shield connected to said first end section of said casing to cover said circuit board, and said light-emitting device and said light sensor provided on said circuit board.

16. The automatic dual-control light emitting assembly for vehicle wheels as claimed in claim 15, wherein said transparent shield is screwed to said first end section of said casing.

17. The automatic dual-control light emitting assembly for vehicle wheels as claimed in claim 16, further comprising an O-ring mounted between said transparent shield and said first end section of said casing.

* * * * *